(12) United States Patent
Erokhovets

(10) Patent No.: US 11,031,785 B1
(45) Date of Patent: Jun. 8, 2021

(54) DEVICE AND METHOD FOR INTELLIGENT CONTROL OF POWER SUPPLY SOURCE CONNECTION

(71) Applicant: Mikhail Valerievich Erokhovets, Moscow (RU)

(72) Inventor: Mikhail Valerievich Erokhovets, Moscow (RU)

(*) Notice: Subject to any disclaimer, the term of this patent is extended or adjusted under 35 U.S.C. 154(b) by 0 days.

(21) Appl. No.: 17/056,792

(22) PCT Filed: May 20, 2019

(86) PCT No.: PCT/RU2019/050065
§ 371 (c)(1),
(2) Date: Nov. 19, 2020

(87) PCT Pub. No.: WO2019/226081
PCT Pub. Date: Nov. 28, 2019

(30) Foreign Application Priority Data

May 24, 2018 (RU) .......................... RU2018119145

(51) Int. Cl.
*H02J 3/38* (2006.01)
*H02J 7/35* (2006.01)

(52) U.S. Cl.
CPC ............... *H02J 3/381* (2013.01); *H02J 7/35* (2013.01); *H02J 2207/20* (2020.01);
(Continued)

(58) Field of Classification Search
CPC ...... H02J 3/38; H02J 3/381; H02J 7/35; H02J 2300/28; H02J 2207/20; H02J 2207/40; H02J 2300/24
See application file for complete search history.

(56) References Cited

U.S. PATENT DOCUMENTS 9,543,761 B2   1/2017 Li et al.
9,846,418 B2  12/2017 Iwata
(Continued)

FOREIGN PATENT DOCUMENTS

RU   2539875 C2   1/2015
RU   2588613 C1   7/2016

OTHER PUBLICATIONS

International Search Report dated Sep. 5, 2019, issued in connection with International Application No. PCT/RU2019/050065 with English Language translation (one page total).
(Continued)

*Primary Examiner* — Robert L Deberadinis
(74) *Attorney, Agent, or Firm* — Tatonetti IP

(57) ABSTRACT

The present device and method provide continuous power supply to consumers at a minimal cost. The present device combines electrical power from a plurality of direct and alternating current sources while working together with or separately from an external electrical power grid. Inside of the device, generation sources are connected via DC/DC and AC/DC converters to a DC bus, to which batteries are also connected via a charge control system. DC current is converted into AC current through reversible AC/DC converters according to the number of grid phases and an AC bus is connected to said converters, allowing for energy from an external grid to also be used for charging the batteries. The method of control is based on a cyclical program for selecting energy sources, said program being executed by a control unit and having dynamic parameter correction that takes into account present and projected energy production and consumption.

16 Claims, 5 Drawing Sheets

(52) U.S. Cl.
CPC ....... *H02J 2207/40* (2020.01); *H02J 2300/24* (2020.01); *H02J 2300/28* (2020.01)

(56) References Cited

U.S. PATENT DOCUMENTS

| | | |
|---|---|---|
| 9,853,452 B2 | 12/2017 | Nakai et al. |
| 2012/0068534 A1 | 3/2012 | Pan |
| 2013/0131876 A1 | 5/2013 | Lee et al. |

OTHER PUBLICATIONS

Written Opinion dated Sep. 5, 2019, issued in connection with International Application No. PCT/RU2019/050065. (English Translation Version) (six pages total).

IEEE Access; Dinesh Kumar, Firuz Zare, and Arindam Ghosh; DC Microgrid Technology: System Architectures, AC Grid Interfaces, Grounding Schemes, Power Quality, Communication Networks, Applications and Standardizations Aspects; pp. 12230-12256; vol. 5, 2017; Unknown Location.

Fig. 3, Continued
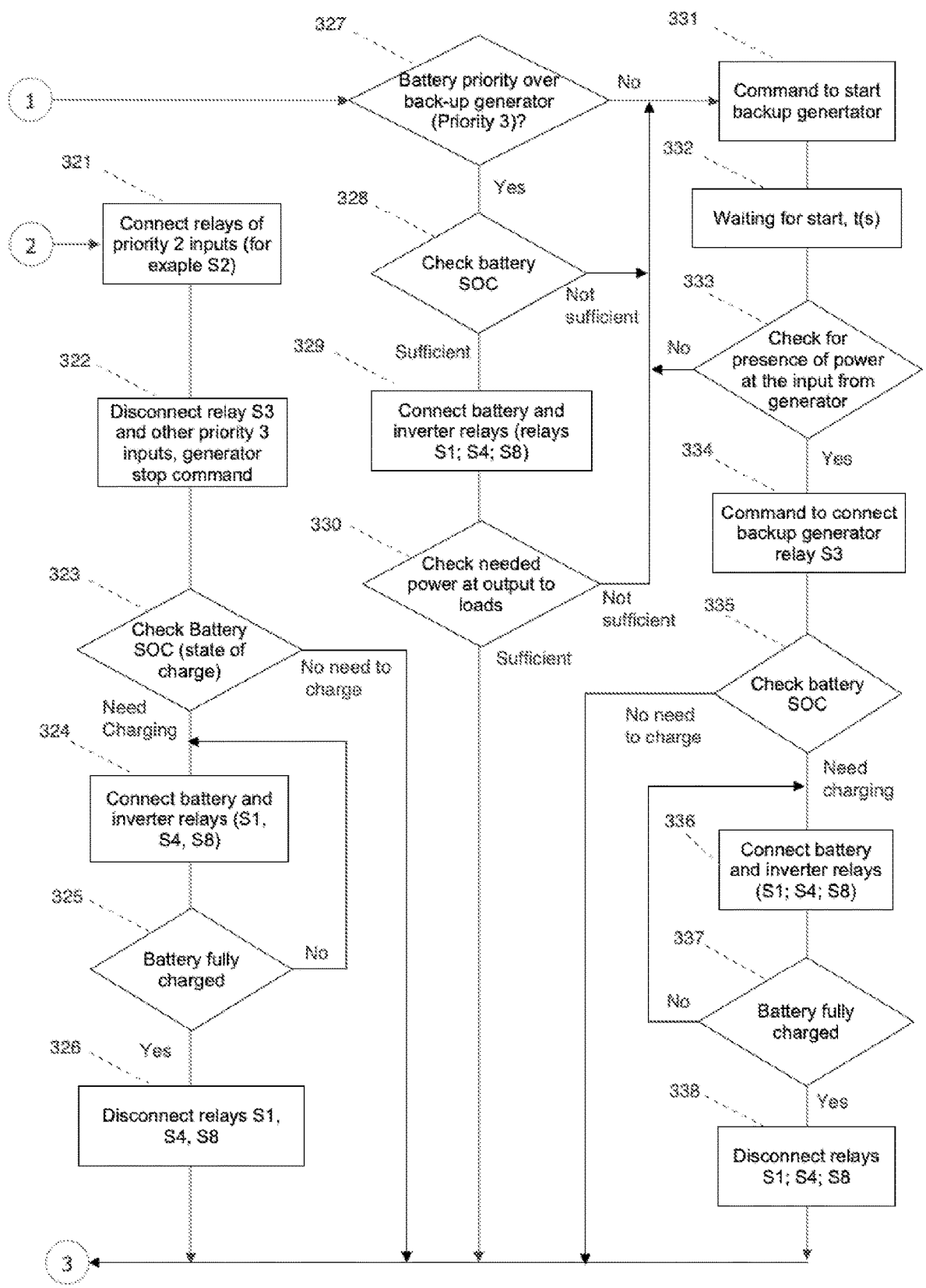

DEVICE AND METHOD FOR INTELLIGENT CONTROL OF POWER SUPPLY SOURCE CONNECTION

CROSS-REFERENCE TO RELATED APPLICATIONS

This Non-Provisional Utility Patent application claims the benefit of and priority to International Application No. PCT/RU2019/050065, filed May 20, 2019, entitled "Device and Method for Intelligent Control of Power Supply Source Connection," which claims the benefit of and priority to Russian Patent Application No. 2018119145, filed May 24, 2018, entitled "Device and Method for Intelligent Control of Power Supply Source Connection," the entire contents of both applications of which are hereby incorporated herein by reference, with a proper claim for priority being made in the Application Data Sheet.

BACKGROUND

The invention is intended to be used in the electric industry. The invention is related to the device and corresponding method of control for intelligent control of electrical energy sources and consumers connection for low and medium voltage electric networks for various sites like homes, buildings, commercial and industrial consumers, which may use own electricity generation resources.

Currently a plurality of various configurations of individual site energy generation and supply is used, including renewable energy sources integration and uninterrupted energy supply solutions with energy storage batteries.

Usually every such solution implies a combination of specific devices either connected with each other or standalone, and each of them being controlled by its own control module.

The examples of such solutions are:
Solar power generation systems—include photovoltaic panels and additional separate devices like charge controllers, power invertors, batteries, and use photovoltaic panels as single source of energy. Such systems often operate in grid connected mode and their main function is to supply produced PV energy to the grid.
Wind power generation systems—usually configured using the same principles as the PV generation systems, except the source of energy is the wind generator.
Hybrid power plants—combining several different generation sources
Uninterrupted Power supply systems—includes AC/DC inverter, batteries and battery charging system. The main purpose of UPS is to ensure quick backup power in case if the main supply source is lost.
Automatic transfer switching systems and fossil fuel based generators.

IEEE Access online magazine, article DC Microgrid Technology: System Architectures, AC Grid Interfaces, Grounding Schemes, Power Quality, Communication Networks, Applications, and Standardizations Aspects" Authors: DINESH KUMAR, FIRUZ ZARE, ARINDAM GHOSH3. Date of publication: Jun. 1, 2017, date of last revision: Jul. 24, 2017. Digital Object Identifier 10.1109/ACCESS.2017.2705914 describes the problems and methods of connecting multiple renewable energy generation sources on one DC bus within the microgrid, it is possible to automatically maintain the voltage threshold on a bus in spite of significant voltage fluctuations on each generation source respectively.

A patent RU #2539875 "A system of electricity supply to consumers in the networks with the use of renewable and non renewable energy sources and control of energy generation" describes a solution of distributed energy generation control the downside of this solution is the need to install dedicated control modules for each generation source and the need for synchronization of power output parameters for each source to ensure their simultaneous operation on a common microgrid, the system does not include energy storage, so the dependency on power availability on at least one of the generation sources is very high.

Also is known the "Home energy Control system and controlling method thereof", patent: U.S. Pat. No. 9,543,761 B2. The system implies connecting renewable energy sources and energy storage unit, unidirectional inverters, separate for energy supply to the loads and to the external grid. The downside of this system is that each functional module is a separate independent unit and there is no possibility to directly connect the external grid to the consumers within the site, also the energy storage is always involved in energy transfer process, which increases the charge-discharge cycling of a battery and reduces battery life. Also separate inverters are used for energy transfer to the internal consumers and to the external grid.

Also is known "Energy Control System, Energy Control Device and Energy Control method for prioritizing a power generation source based on the possibility of selling generated power" patent: U.S. Pat. No. 9,846,418 B2. The system suggests connecting generation sources such as PV panels and gas fuel cell generator to a same control system, and the control program is mainly focused on ensuring ability to sell energy into the grid. The system does not contain any energy storage based on batteries.

The closest prior art is described in U.S. Pat. No. 9,853,452 B2 "Power control apparatus, power control method, program and energy management system."

The specified apparatus implies the possibility to connect several generation and energy storage sources by a DC bus and following energy conversion to AC for energy supply to consumers or to external grid. The downside of described apparatus is the lack of possibility to connect energy generation sources on the AC side as well as continuous connection of the device to the external grid, which limits the ability to flexibly change energy source priorities from various connected generation sources or batteries. Also the described control method implies firmly set priority based on the presence and quality of energy from only one generation source.

SUMMARY

The present device and method provide continuous power supply to consumers at a minimal cost. The present device combines electrical power from a plurality of direct and alternating current sources while working together with or separately from an external electrical power grid. Inside of the device, generation sources are connected via DC/DC and AC/DC converters to a DC bus, to which batteries are also connected via a charge control system. DC current is converted into AC current through reversible AC/DC converters according to the number of grid phases and an AC bus is connected to said converters, allowing for energy from an external grid to also be used for charging the batteries. The method of control is based on a cyclical program for selecting energy sources, said program being executed by a control unit and having dynamic parameter correction that takes into account present and projected energy production and consumption.

DETAILED DESCRIPTION

Figure 1:
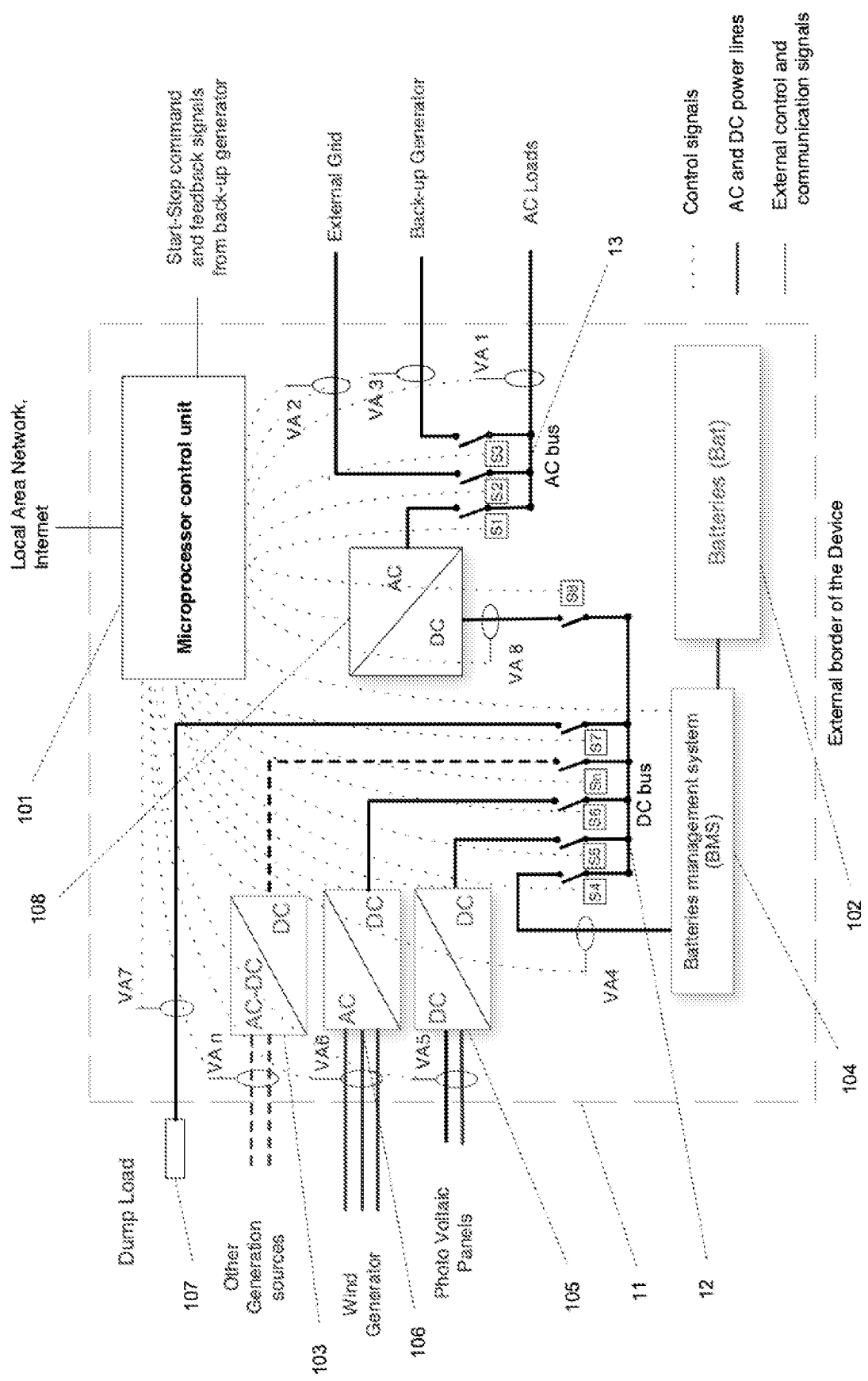
FIG. 1: Principal schematic of the device for control of energy supply to the site enabled with AC output for energy supply to the loads and inputs from generation sources: external grid, standby generator, PV panels, wind generator, other generation sources
Figure 2:
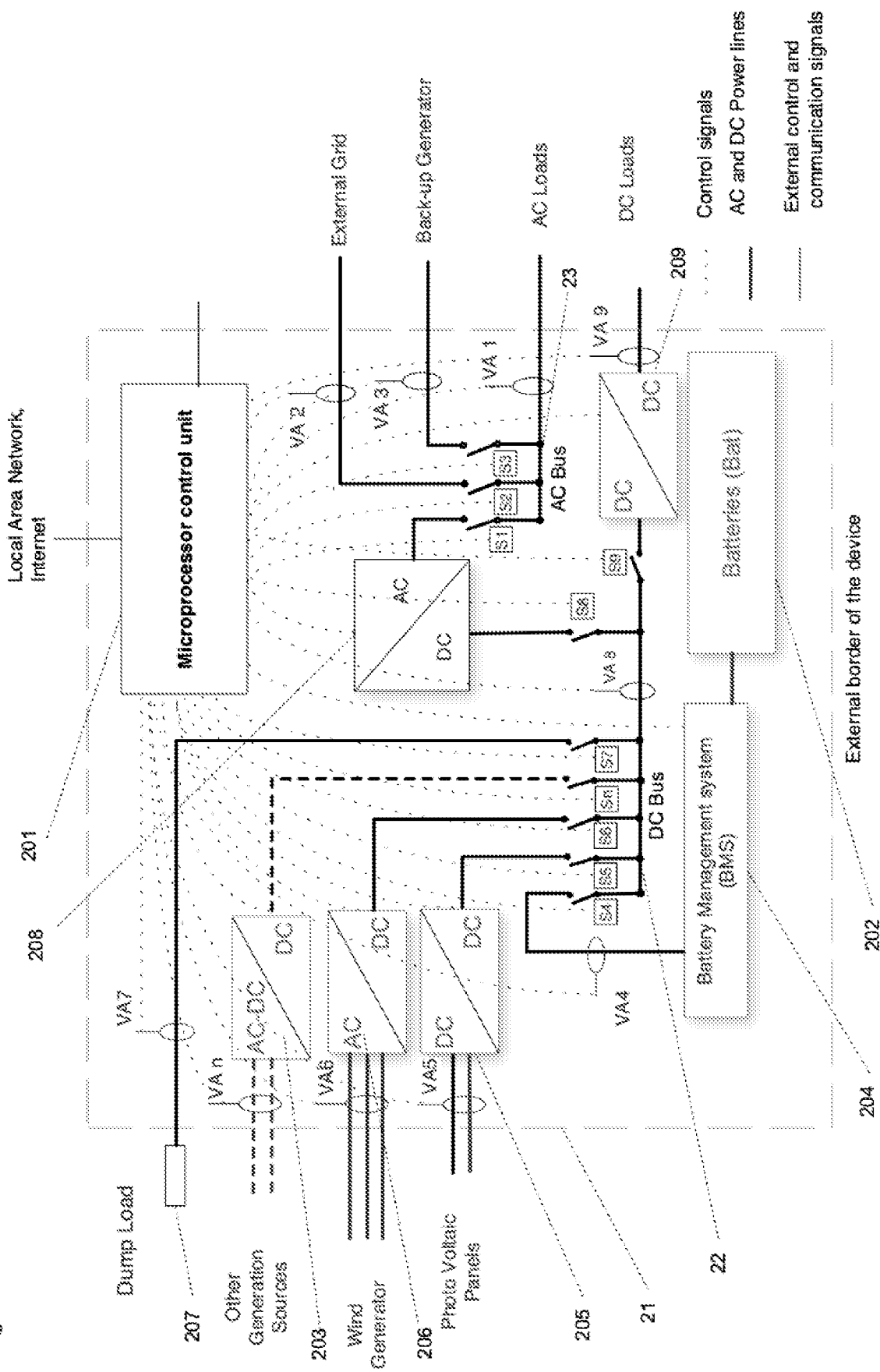
FIG. 2: Principal schematic of the device for control of energy supply to the site enabled with AC and DC outputs for energy supply to the loads and inputs from generation sources: external grid, standby generator, PV panels, wind generator, other generation sources

The device (schematic drawing on FIG. 1 and FIG. 2) contains inside one common enclosure, the following modules, connected via DC bus and AC bus: energy conversion modules for external generation sources, specifically DC/DC converters 103, 203, 105, 205; and AC/DC converters 103, 203, 106, 206; bidirectional AC/DC converters—one in case of single phase system and three in case of three phase system, 108, 208; switching contactors S1-Sn; AC phase synchronization modules, power transformers, batteries 102, 202; battery management system 104, 204; microprocessor control unit 101, 201; protection circuit breakers and electric safety devices.

Converters 103, 203, 105, 205, 106, 206, are capable of maintaining DC voltage control on the DC bus side. The Device has following connection points for external connections: connection for one or more DC PV strings; connection of one or more AC generators like wind turbines, connecting external generator equipped with own control system such as modular standby generator operated by internal combustion engine; one or more grid connection points; DC connection point for external resistor load 107, 207; AC connection point for feeding the loads on the site; the device may also be equipped with a connection point for feeding DC loads with or without DC/DC convertor 209.

The control of the Device is performed by a software program in the microprocessor control unit 101, 201, which has electric current and voltage sensors VA1, VA2, VA3, VA4, VA5, VA6, VA7, VA8 . . . VAn and switching control devices S2, S3, S4, S5, S6, S7, S8, S9 . . . Sn connected to it via cable connections.

Also microprocessor control module has internal data bus connections to the AC/DC and DC/DC converters 103, 203, 105, 205, 106, 206, 108, 208 and battery management system 104, 204. For the following description of system operation it is suggested to use an example of single phase device schematic with one AC grid connection point, one photovoltaic DC string, one three-phase wind generator, one auxillary standby generator based on internal combustion engine, one connection point for power supply to the consumer loads, one DC connection point for the dump load resistor.

Description of the Control Method

The method is based on a cyclical control algorithm (FIG. 3), executed by a microprocessor control module 101, 201, with the application of flexible automatic correction approach for the input parameters of the program. The basic input parameters of the program are defined by user and are such as, but not limited to: input priority from generation sources and from the grid, battery priority. The priority of inputs from the energy sources are flexibly defined/adjusted based on the time of the day, day of the week, state of charge of the battery, minimal power produced by the generation sources to enable the connection to this source, permission to export energy to the external grid, main parameters of energy cost such as grid supply tariffs, fuel cost for the generator, etc.

Microprocessor control module 101, 201 may be connected to external computer network and internet and may have a built in web server. Microprocessor module 101, 201 may receive data about the forecast of wind speeds and solar irradiation intensity from external sources on the internet. Microprocessor module 101, 201 continuously analyses and stores statistical data about consumer loads profiles and systematic priorities of energy usage by times of day, days of the week, months of the year, so the expected average power demand is known for every moment of time as well as expected peaks in loads power and consumption.

Figure 3:
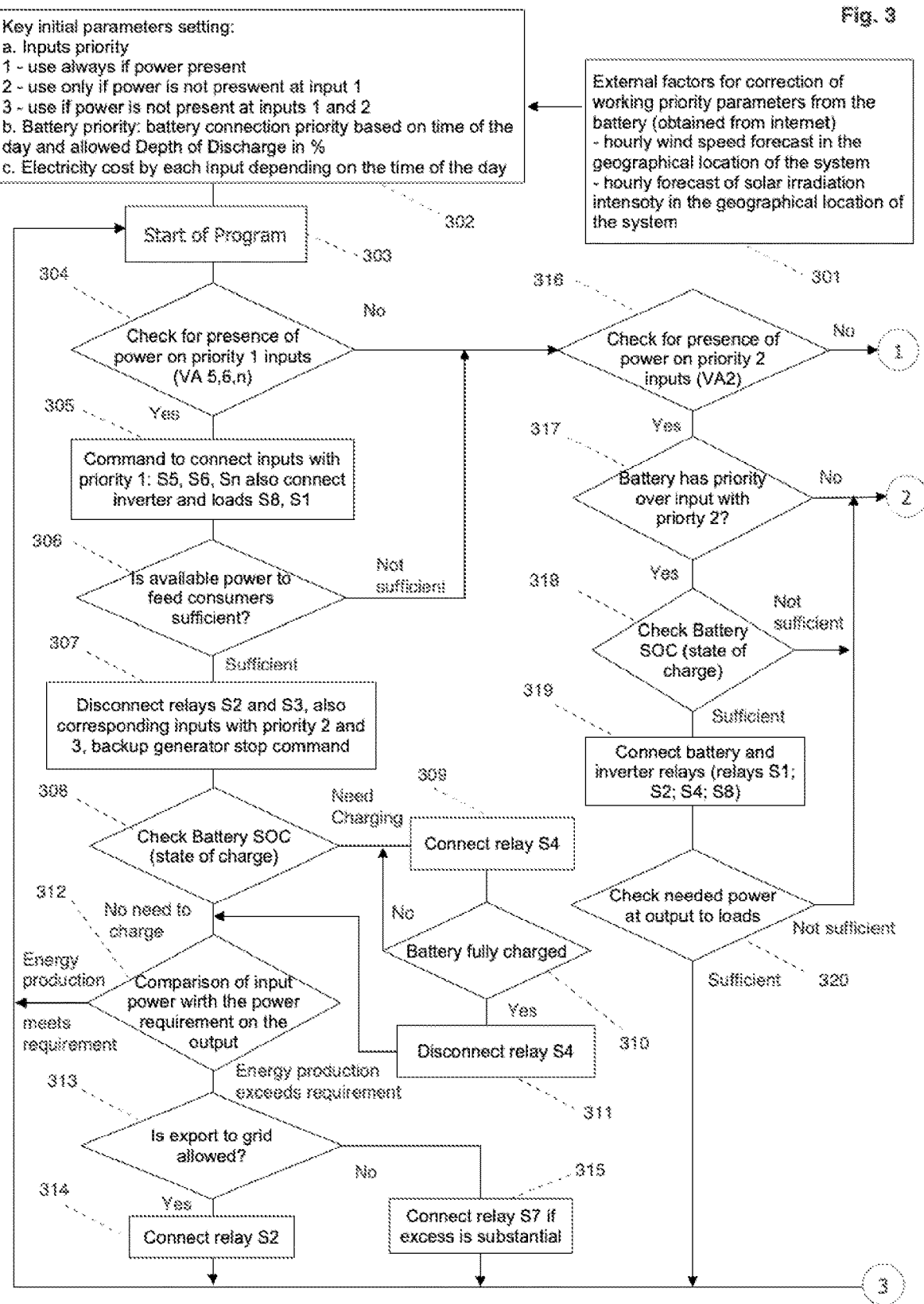
FIG. 3: Principal schematic of the algorithm of the method to control energy sources connection

Prior to the execution of control algorithm the initial settings are inserted into the system 302, FIG. 3., such as but not limited to: nominal electric power or main system components—external generation sources, output power to consumer loads; nominal capacity of the battery; allowed depth of discharge; base priorities of the generation sources and the grid; battery priority; energy cost from the grid; possibility to export excess energy to the grid, etc.

To simplify the description of system operating principles the following priorities are assumed: Priority 1—own generation sources inputs with sensors VA5, VA6, . . . VAn; Priority 2—external grid input, sensor VA2; Priority 3—standby generator input. The batteries source priority is dynamically changed based on the information received by microprocessor control module 101, 201, from external computer network.

When main operating parameters are defined, the execution of control program 303 begins. As the algorithm is executed the circular data acquisition is performed from current and voltage sensors VA1-VAn. Based on the readings of the mentioned sensors the presence and quality of energy at the device connection points is confirmed.

After input of main operating parameters the execution of control program 303 begins. Within cyclical query of voltage and current sensors VA1-VAn is executed. Based on the VA1-VAn sensor readings the presence and quality of energy on the device inputs are defined. At the program step 304 if the power is detected on the sensors VA5;VA6;VAn the execution of algorithm is moved to step 305, if no power detected—to step 316.

On a step 305 the microprocessor commands to switch on the input relays with priority 1, such as relays S5, S6, Sn—for the inputs which have corresponding sensors VA5, VA6, VAn, which have detected sufficient power capability. Within the execution of this step either one or multiple inputs can be connected which are generating energy and properly synchronized. Also relay S8 is switched on for connecting bidirectional inverter AC/DC and relay S1 for connecting AC loads. If these relays were in the «on» state at the beginning of step 305, these relays remain on.

Going forward the program moves to step 306 where the loads power requirements are assessed considering VA1 sensor readings and statistical information in the memory of control system as well as comparing current energy requirements with current energy production from the sources with priority 1—sensors VA5, VA6, VAn.

In case if current power generation is not sufficient, the program moves to the step 316. In case if the current power generation is sufficient, moves to the step 307. On a step 307 the relays of energy sources with priority 2 and 3 are disconnected, specifically relays S2 of the grid and relay S3 of auxillary generator.

Control module also commands the generator to stop in case if the generator was working. At the step 308 the SOC analysis is performed for the batteries 102, 202. Also the data from VA4 and battery management system 104, 204 are analysed. In case if the batteries are fully charged, the program moves to the step 311.

In case if the batteries need charging, the program moves to step 309. At step 309 the control system commands to switch on the relay S4 to connect the battery then the system moves to step 310. At step 310 the current state of charge of batteries 102, 202 is analyzed via the data from the sensor VA4 and the battery management system 104, 204.

In case if the batteries require further charging, the program returns to the step 309. In case if the batteries are fully charged, the program moves to step 311. At step 311 the battery disconnects from the DC bus by the relay S4.

On a next step 312 the comparison of power produced by own generation sources with the required power by own loads. In case if own energy production is sufficient and not exceeding own needs, the program branch is completed and the cycle begins again.

In case if own generation is exceeding the needs of own loads the program moves to step 313. At this step the program verifies allowance to export energy into the grid, this condition may be one of the initial program settings, selected by the user at step 302 of the program, or can be communicated to the control module by external communication channels including internet.

In case if export is allowed, the program switches to step 314, if the export is not allowed, to step 315. At step 314 the external grid connection is activated via the relay S2. At the step 315, if the excess energy is produced, a balancing load can be activated, by switching on relay S7.

After executing the steps 314 or 315, the device continues operation in selected mode until changes occur in the program module 304 or 306. In case of changes in modules 304 or 306, for example if the own generated energy is not sufficient, the program switches to step 316.

At step 316 the system checks presence of power at the inputs with priority «2», for example the presence of grid energy supply. In case of the power is not present at sources with priority «2», program switches to step 327.

In case if power is present on at least one of the inputs with priority «2», the program switches to step 317. At this step the priority of batteries is checked over priority «2» inputs, this condition may be set by user in system settings at step 302, of the program, or can be communicated to the control module by external communication channels including internet. Correction of battery current priority may be also performed according to algorithm presented at FIG. 4.

In case if at a given moment of program execution the inputs with priority «2» have higher priority, the program goes to step 321. In case if at a given moment of program execution the batteries have higher priority, the program goes to step 318. At step 318 the checking of SOC—state of charge of the battery is performed. If the SOC is not enough for reliable power supply to the loads within the time set in step 302 of the program, the program goes to step 321, is the state of charge is sufficient, the program goes to step 319. At step 319 the battery 102, 202 connects to the loads via the invertor 108, 208, by switching on the relays S1, S4, S8 at FIG. 1 and FIG. 2. At the following step 320 the control system tracks whether the power supplied from the battery 102, 202 via the invertor 108, 208, is sufficient to power the AC loads. In case if the power is sufficient, the system continues to supply the AC loads from the battery until the changes occur in preceeding program modules according to the query cycle of the sensors. In case if the power is not sufficient to power the loads, the system switches to step 321.

At step 321 the inputs from AC grid with priority «2» are connected by switching on relay S2. At the next step 322 of the program the checking of status of inputs with priority «3» is performed and the back up generator is stopped. In case if the inputs with priority «1» are connected, their status is not changed. At the next step 323 of the control program the SOC of the batteries 102, 202, is analyzed by collecting data from the sensor VA4 and battery management system 104, 204. If the batteries are fully charged the system continues to operate in the current mode until changes occur in modules 304 or 316 of the program.

In case if the battery needs charging, the system goes to step 324. At step 324 the control system connects the battery with relay S4 as well as relays S1 and S8 of invertor connection. Then the system goes to step 325. At step 325 the system analyzes the state of charge of batteries 102, 202, by collecting data from the sensor VA4 and battery management system 104, 204. In case if the battery requires further charging the system returns to step 324. In case if the batteries are fully charged, the system goes to step 326. At step 326 the batteries are disconnected from DC bus by switching relay S4 «off» as well as switching off relays S1 and S8 of the inverter but only incase if other DC generation sources are not active and connected by step 305 command. If such sources are producing and in use, the invertor relays S1 and S8 remain in the «on» position. After this the system continues to operate in the current mode until changes occur in modules 304 or 316 of the program.

At step 327 the system checks the priority of batteries over the inputs with priority «3», which can be for example inputs from standby generator source. This condition may be set as part of initial user settings at step 302 of the program, or can be communicated to the control module by external communication channels including internet.

Figure 4:
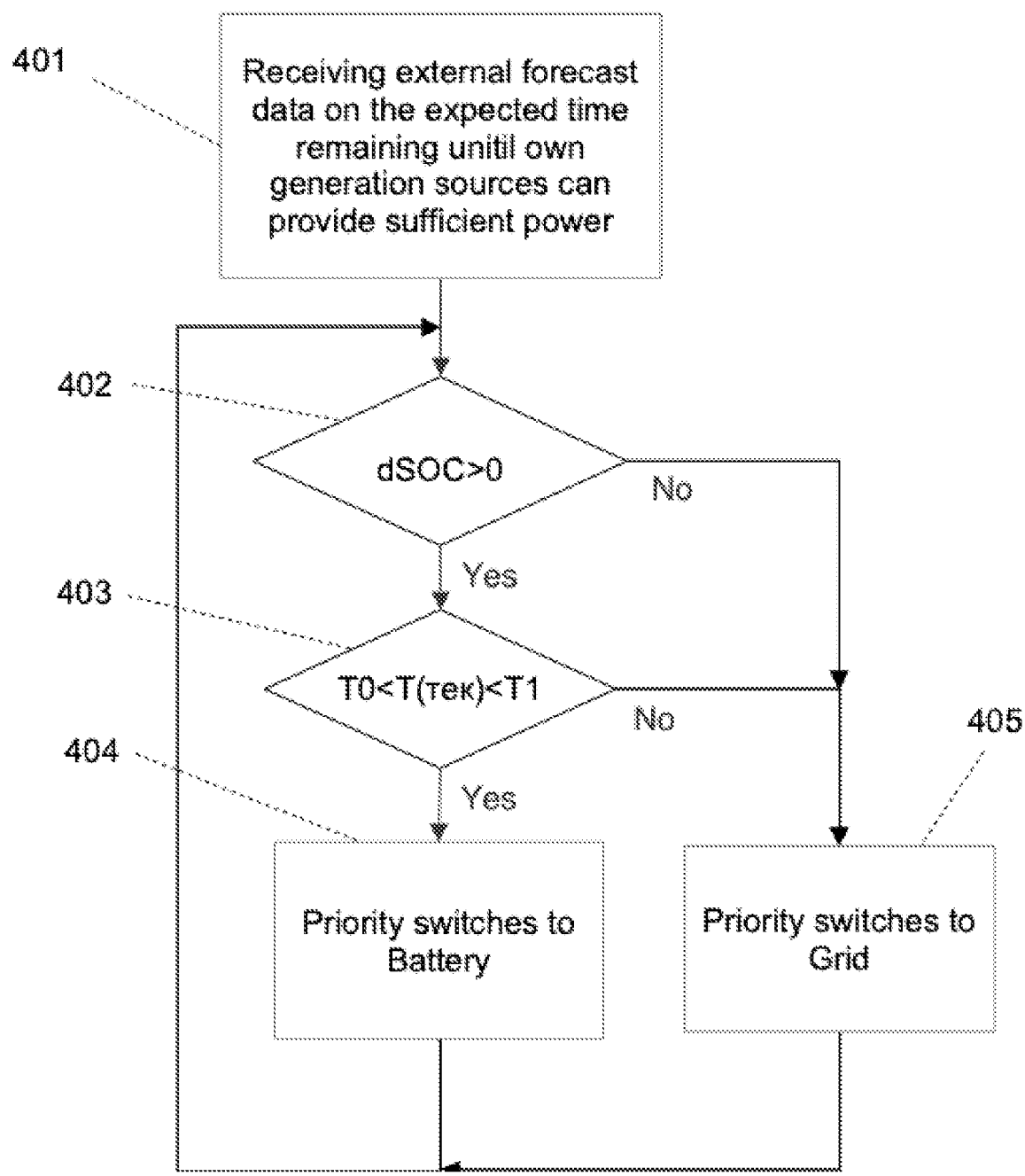
FIG. 4: Principal schematic of the algorithm of dynamic adjustment of priority of energy sources connection.

The adjustment of current battery priority in response to the data received from external systems can be done according to the algorithm at FIG. 4 similar to priority of battery over inputs with priority "2". In case if at the current moment of the algorithm workflow the input with priority «3» has priority over battery, the program goes to step 331. In case if at the current moment of the algorithm workflow the battery has priority over the input with priority «3», the program goes to step 328. At step 328 the battery SOC is measured, if the state of charge is not sufficient for reliable supply of the loads for the period of time defined by user at step 302 of the program, the program goes to step 331, if the SOC is sufficient, the program goes to step 329. At step 329 the batteries 102, 202, are connected through the inverter 108, 208, to the AC loads by switching on relays S1, S4, S8 at FIG. 1 and FIG. 2. On the next step 330 the control system monitors the sufficiency of power provided by the batteries 102, 202, through the inverter 108, 208 for the supply of connected AC loads. In case if the power is sufficient the system continues to operate from the batteries until changes are detected in prior steps of the algorithm according to the program query cycle. In case if the power is not sufficient, the program goes to step 331. At step 331 the command to start the standby generator is performed, which is sent to the generator control system, after that the program goes to step 332, where the program is waiting for generator start confirmation for the time period defined in module 302. After that the program goes to step 333 where the confirmation of power presence from the sensor VA3 is received. If the voltage and power is present on VA3 sensor, the generator has started successfully, the program goes to step 334, where the generator is connected to the load by relay S3. At the next step 335 of the program the current SOC of batteries 102, 202 is analyzed, also the data of VA4 sensor and battery management system 104, 204. In case if the batteries are fully charged the system continues to operate until further changes take place in modules 304, 316 or 327.

In case if the batteries require charging the system goes to step 336. At step 336 the control system commands to switch on the relay S4 connecting the battery, and also relays S1 and S8 connecting inverter. After that the program goes to step 337. At step 337 the system analyzes the state of charge of batteries 102, 202, by collecting data from the sensor VA4 and battery management system 104, 204. In case if the battery requires further charging the system returns to step 336. In case if the batteries are fully charged, the system goes to step 338. At step 338 the batteries are disconnected from DC bus by switching relay S4 «off» as well as switching off relays S1 and S8 of the inverter but only in case if other DC generation sources are not active and connected by step 305 command. If such sources are producing and in use, the invertor relays S1 and S8 remain in the «on» position. After this the system continues to operate in the current mode until changes occur in modules 304 or 316 of the program.

Corrective adjustment of parameters in module 302 is performed by comparison of expected energy production by own generation sources depending on the hourly weather forecast like wind speed, solar irradiance, which can be acquired from outside resources on the internet, and expected own consumption based on statistical own consumption data of the system.

The main setting parameter which is being adjusted and changed based on the described algorithm is the «Battery priority» parameter. When adjusting this parameter its priority is shifted one way or the other towards the inputs with priorities «2» and «3», based on expected own energy generation.

For example if we have a nigh time off peak tariff, and there is no solar generation in the night, so the priority of the grid input may be set higher than the battery for the night consumption, so the system will switch to the grid input. But if in this case we use dynamic correction of priority, if in the morning we expect enough sun to produce sufficient energy for own consumption and battery charging, and if there is sufficient energy in the battery to ensure own loads consumption until anticipated start of own generation, the priority may be automatically adjusted towards battery use priority.

To define the time period for which the battery priority will be shifted can be calculated using the formula:

$T(bat)=P(bat)/P(av \cdot h)$, where: $P(bat)=C(bat)*V(bat)*dSOC$, where: $dSOC=SOC-SOC(min)$.

C—Amp Hours, nominal full capacity of the batteries
V—Volts, Battery voltage
SOC—%, current state of charge of the battery in % of full charge
SOC(min)—%, user defined minimum allowed state of charge,
dSOC—available interval of usable state of charge
P(av·h), kWh—average statistical hourly energy usage within the considered time period,
P(bat), kWh—available energy capacity of the battery
T(bat), hours—available operating time of the battery with current state of charge The decision about shifting of the battery priority is executed by the program depending on the forecasted time for own generation sources to start production and the nominal power output and the available time for the system to operate from the battery. T1—the time for the generation sources to achieve target production level, T0—earliest possible time to start energy consumption by loads from the battery. T0=T1−T(bat). So the system will make a decision to shift the priority and switch to consumption from the battery in case if the current time of switching action T(cur) is within the threshold: T0<T(cur)<T1. The priority adjustment is performed in the following way: the higher level system (internet) is supplying the data about the expected solar irradiance, outside temperature, wind speed in the geographical location of the installed system, 401 FIG. 4; 301 FIG. 3. The microprocessor module performs the calculation of expected consumers power for the given time and expected generation power by own generation sources and the time is calculated when the generation sources will be able to fully cover own demand. Then the current battery SOC is analyzed and the available SOC of the battery (dSOC), 402. In case if the available battery SOC is not sufficient, the priority remains with the sources with priority «2», usually this will be the grid, and the program goes to step 405. In case if there is available energy in the battery dSOC, and dSOC>0, the program goes to step 403. At step 403 the comparison of available time to operate from the battery and the time period till own generation sources achieve required power output is performed. If switching to the battery at the current moment of time will ensure sufficient energy supply from the battery until own generation sources will be providing sufficient energy supply to the loads, specifically T0<T(cur)<T1, the program goes to step 404 and the priority is shifted to the battery. If battery energy is not sufficient, and the program goes to step 405, and the priority remains with the grid.

The invention claimed is:

1. A device for intelligent control in low and medium voltage networks for residential, commercial and industrial sites to enable uninterrupted power supply to consumers, using a public grid, renewable energy sources, and backup generator, comprising:

a combined unit built in a single and same enclosure consisting of one or several interconnected sections of wall or floor mount, in which the combined unit contains interconnected modules for control of electric energy;

one or more DC/DC converters, including PV maximum power point tracking (MPPT);

one or more AC/DC converters for connecting wind generation or other generation sources of alternate current;

bidirectional AC/DC converters-power inverters, which include built in power transformers and public grid synchronization components, allowing conversion from AC to DC and DC to AC in quantities corresponding to a number of phases of a connected public grid and consumers, in which batteries are connected to a DC bus via a charge control module and BMS, and current and voltage sensors connected to a system control unit and which are installed at an input of every AC/DC and DC/DC converters, at AC and DC bus, and at an input of battery charging system;

the AC/DC, DC/DC, and DC/AC converters are connected to the DC bus via embedded DC voltage regulators for synchronization of DC voltage when multiple devices are connected to the DC bus, and relays at connection points to the DC bus;

at a same time as the bidirectional AC/DC converters-power invertors are operating, bidirectional DC/AC converters are also connected to an AC bus, in which the AC bus is also connected to, using power relays, AC consumers, public grid input, and AC generation units;

at inputs from AC generation sources as well as outputs to consumers, the current and voltage sensors are installed which are connected to the system control unit;

inputs of the device are connection points of external generation sources and public grid power cables in the device, and outputs of the device are connection points of the public grid power cables to the consumers and balancing load;

a public grid connection point is used as input or output of the device when the device is consuming from the public grid or exporting to the public grid accordingly;

a DC/DC convertor is installed at connection points for the DC loads for when voltage of the DC loads differs from voltage of the DC bus;

data communication among modules is performed via connecting all devices to data bus connected also to a microprocessor control unit, in which the microprocessor control unit performs intelligent control and coordination of operation of all the interconnected modules and executing algorithms of power sources connection by sending commands to the interconnected modules and power relays of each converter, grid input or output, backup generator input, consumer loads output, and also enabling connection of the device to external data networks.

2. The device of claim 1, wherein all control, energy conversion and storage components are assembled in the single and same enclosure.

3. The device of claim 1, further comprising connecting more than one energy generation sources of different generation principles, including photovoltaic DC generators, induction AC generators, and AC and DC generators.

4. The device of claim 3, wherein all of the electric energy inside the device supplied by various generation sources is converted to DC and stored in one or more batteries connected to the DC bus directly or via the one or more DC/DC converters.

5. The device of claim 1, wherein the electric energy at the output of the power invertor is converted to AC with voltage, frequency, and sine wave synchronized with the external public grid.

6. The device of claim 1, further providing the electric energy on the AC and DC outputs by summarizing the electric energy of several sources connected to the device.

7. The device of claim 1, further comprising a built-in web server configured with a wireless or wired connection to the network.

8. A method of performed by a device configured for intelligent control of supplied and consumed electrical energy for residential, commercial, and industrial sites that is equipped with one or more sources of electrical energy, including renewable energy, comprising:

measuring a current and voltage of electrical components, including an external grid, current and voltage of connected AC and DC generation sources, state of charge, voltage and current of connected batteries, current and forecasted electrical energy demand by connected consumers, in which the measuring is performed by querying of various sensors associated with the measured components;

measuring of current and voltage on inputs from generation sources including photovoltaic panels, wind generators, standby generators, and the external grid, in which the measuring is performed by continuous cyclical querying of current and voltage sensors;

responsive to a sensor readings at an input of the device from a renewable energy sources which has been identified as having high priority, in which the sensor readings indicate detecting sufficient electrical energy production of the renewable energy source, the microprocessor control unit connects the electrical energy source to a DC bus, and at a same time sending a command for a back-up generator to stop when the generator is simultaneously operating, wherein based on a state of charge measurement, the microprocessor control unit commands for charging to begin;

based on the voltage and current sensor readings at an output to consumer and comparison with the sensor readings at the input from the renewable energy source with the high priority, determining, using the microprocessor control unit, whether to direct electrical energy for battery charging based on an assessment of whether the high priority renewable energy source is sufficient to cover current demand from the connected loads;

analyzing, by the microprocessor control unit, a possibility to export excessive energy to the external grid based on an export permission either defined by a user during an initial setup or based on a received command from another system over a network;

producing, at the microprocessor control unit, a command to disconnect the external grid if export is not permitted, or commanding a bidirectional inverter to begin electrical energy export to the external grid when export is determined to be permitted and expedient;

when available electrical energy of the renewable energy sources with the high priority is not enough based on the sensor readings of energy sources with medium priority, electrical energy is available at the inputs from the sources of medium priority when required including the external grid, the microprocessor control unit connects the sources with the medium priority;

when the electrical energy on the inputs from the high and medium priority sources is not sufficient, connecting, using the microprocessor control unit, to the sources identified as having a low priority, including the standby generators, by sending a command to start the source and receiving the feedback from the voltage and current sensors at the device input associated with the source; and receiving, from over a network, data from external systems to dynamically correct the main algorithm, in which the microprocessor analyzes a priority settings of the energy sources and that the priority settings are adjusted such that the priority of each source is increased or decreased in anticipation of a weather forecast predicting favorable conditions for producing sufficient energy in a defined period of time, and wherein the microprocessor control unit analyses remaining state of charge of the batteries, expected energy consumption by the loads for a time period remaining until sufficient production of own energy sources is expected to begin according to the weather forecast, and switches the energy consumption by loads to the batteries, and disconnecting the external grid and other energy sources with the lower priority setting, and wherein when the data received from the external systems indicate favorable price for exported energy, if the high priority sources are not producing, the microprocessor control unit analyses current state of charge of the batteries, own energy demand and expected production of own generation sources according to weather forecast, and when the available energy in the batteries exceeds own consumers demand until an expected start of generation by own sources, and the microprocessor control unit commands the bidirectional AC/DC inverter to switch to energy export mode, and at a same time the readings from the voltage and current sensors at the output of the inverter and the input from the external grid are analyzed and the amount of exported energy is measured, the command to stop the export is sent when the remaining state of charge of the batteries reduces to a minimum required and sufficient level to power own loads for a period of time until own generation sources production is expected.

9. The method of claim 8, wherein continuous monitoring of presence and quality of electrical energy from all connected energy sources as well as own energy demand is performed and an ability to export energy to the external grid is present.

10. The method of claim 8, wherein the conversion of the electrical energy generated in various forms, including AC, DC, and various voltages, to direct current of same voltage is performed, which is within limits of working voltage of the batteries, and then to alternating current with parameters of the external grid.

11. The method of claim 8, wherein a main system processor unit analyses data from the current and voltage sensors on the device inputs, current time of day, state of charge of the batteries, energy cost from the external grid, cost of fuel for the standby generator, power rating and hourly fuel consumption of the standby generator, weather forecast from open sources on the internet, and sending commands to control relays of the system, as a result the main system processor unit calculating which of the energy sources are preferred at every current moment of time, and connects to such energy sources.

12. The method of claim 8, wherein simultaneous connection of multiple generation sources is possible, and at every moment of time priority is given to most economical sources.

13. The method of claim 8, wherein connection of additional energy sources is performed automatically based on demand for more energy from the consumers.

14. The method of claim 8, wherein when the electrical energy generation is exceeding electrical energy demand, excess energy is exported to the external grid.

15. The method of claim 8, wherein a control system is configured to execute self-learning algorithms, specifically keeping in memory mostly repeated modes of operation and power consumption based on a time of day and day of a week, and allows to automatically adjust connection of energy sources based on an expected power demand.

16. The method of claim 8, where priorities of energy sources connections are dynamically changed by a program, and based on the weather forecast analysis received from internet.

\* \* \* \* \*